United States Patent [19]

Irani et al.

[11] Patent Number: 4,623,712

[45] Date of Patent: Nov. 18, 1986

[54] METHOD FOR HIGH TEMPERATURE PHASE SEPARATION OF SOLUTIONS CONTAINING POLYMERS

[75] Inventors: Cyrus A. Irani, Katy, Tex.; Charles Cozewith, Westfield; Stephen S. Kasegrande, Lincoln Park, both of N.J.

[73] Assignee: Exxon Research & Engineering Co., Florham Park, N.J.

[21] Appl. No.: 623,850

[22] Filed: Jun. 25, 1984

Related U.S. Application Data

[63] Continuation-in-part of Ser. No. 473,741, Mar. 9, 1983, abandoned.

[51] Int. Cl.$^4$ .................................................. C08F 6/12
[52] U.S. Cl. ...................................... 528/498; 528/491
[58] Field of Search ................................. 528/491, 498

[56] References Cited

U.S. PATENT DOCUMENTS 4,319,021  3/1982  Irani et al. ......................... 528/498

*Primary Examiner*—Paul R. Michl
*Attorney, Agent, or Firm*—S. H. Markowitz

[57] ABSTRACT

A process is disclosed for recovering polymer from a solution of the polymer in a solvent by high temperature phase separation in which low molecular weight hydrocarbon is added to the solution, the solution and the added hydrocarbon are subjected to a temperature and pressure so that one liquid phase is formed and the pressure is adjusted to form two phases, namely, a polymer-lean liquid phase and a polymer-rich liquid phase. The polymer-rich liquid phase is separated from the polymer-lean liquid phase, and the polymer is then recovered from the polymer-rich liquid phase.

18 Claims, 2 Drawing Figures

METHOD FOR HIGH TEMPERATURE PHASE SEPARATION OF SOLUTIONS CONTAINING POLYMERS

CROSS REFERENCE TO RELATED APPLICATIONS

This application is a continuation-in-part of application Ser. No. 473,741 filed Mar. 9, 1983, abandoned.

BACKGROUND OF THE INVENTION

The present invention relates to a process for recovering hydrocarbon polymer from a solution of such polymer in a solvent by using high temperature to cause a phase separation. More particularly, the invention relates to a process for improving the efficiency of the separation of hydrocarbon polymers from their solution in a solvent.

In the manufacture of such polymers by solution polymerization, a common technique used to separate the polymers from the solution in which they are formed is by steam stripping. In this method, the polymer solution and steam are added to a drum of agitated hot water to flash distill the solvent. As the solvent is removed, the polymer precipitates and is recovered by filtration or screening in the form of wet crumb particles. These particles can then be dried by standard methods such as extrusion.

Because of the rising cost of energy, including steam, the above method has become expensive and various techniques have been explored for reducing the amount of steam and energy required for separation of polymers from the solvents in which they were formed. One such technique is high temperaure phase separation. A number of variations of the general technique are known. For example, U.S. Pat. No. 3,553,156 discloses a process in which a solution of ethylene copolymer elastomer in a solvent is heated, while maintaining a sufficient pressure to keep the solution in one liquid phase, to a temperature and pressure at which two liquid phases form, one of these phases being relatively rich in the elastomer. The polymer-rich phase is decanted and the polymer recovered from it by evaporation of the solvent. In this process, the patentees themselves state that it is only necessary that the temperaure and pressure are selected so that both phases behave like liquids. They also state, however, that the amount of unreacted monomer, such as propylene, will have its effect on the phase diagram for the polymer-in-solvent system.

Similarly, U.S. Pat. No. 3,496,135 discloses a process in which a polymerization reaction product mixture containing ethylene copolymer is admixed with an antidegradation agent and, while maintaining sufficient pressure to keep the mixture in one liquid phase, the mixture is heated to a temperature at which two liquid phases form. The two liquid phases are separated by decantation and the solvent from the copolymer-rich phase is evaporated. The anti-degradation agent, e.g., a Lewis base such as furan, dialkyl aluminum alkoxides, etc., are said to protect the copolymer from degradation under the temperature and pressure conditions necessary to produce a phase separation.

Another such process is disclosed in U.S. Pat. No. 3,726,843 in which a solution of an ethylene copolymer is heated to a temperature and pressure sufficient to form two liquid phases, one of which is a copolymer-rich liquid phase. The copolymer-rich liquid phase is separated from the other phase by decantation, and then passed under substantially adiabatic conditions into an intermediate lower pressure zone maintained at a pressure low enough to vaporize sufficient solvent to maintain a solvent vapor phase. The resultant copolymer-rich phase from the intermediate zone is then extruded under substantially adiabatic conditions into a subatmospheric zone at a rate below that at which fines of the copolymer are formed. The latter zone has a temperature and pressure which volatilizes residual solvent in the copolymer-rich phase, and produces an essentially solvent free product.

Such prior art processes are subject to a number of disadvantages. For example, steam is usually used to heat the polymer solutions to a sufficient temperature to obtain the phase separation. Depending upon the solvent used, these temperatures can be quite high, e.g., with hexane as a solvent temperatures of about 250° C. are required. In view of the rising costs of steam energy, such high temperatures are undesirable. Moreover, as noted in U.S. Pat. No. 3,496,135, discussed above, at the temperatures necessary to achieve phase separation, degradation of the ethylene copolymers is possible.

SUMMARY OF THE INVENTION

It has now been found that efficient phase separation and recovery of polymer from solution, for example, from solution polymerization reaction mixtures, can be achieved at lower temperatures, thereby reducing energy cost and decreasing the incidence of polymer degradation. These objectives are obtained by a process in which low molecular weight hydrocarbon is added to a solution of the polymer in a solvent. The polymer solution and added hydrocarbon are subjected to a temperature and pressure sufficient to form a polymer-rich liquid phase, a polymer-lean liquid phase, and, optionally, a vapor phase rich in the hydrocarbon. The polymer-rich liquid phase is separated from the polymer-lean liquid phase and the vapor phase, if optionally formed, and the polymer is recovered from the separated polymer-rich liquid phase. In this process, addition of the hydrocarbon reduces the temperature at which an effective phase separation is obtained. By forming two liquid phases and a vapor phase, even more efficient separation may be obtained.

Processes in accordance with the present invention for recovering polymer from a solution of said polymer comprise:

(i) preparing the solution of polymer is a reactor;

(ii) adding to the thus-prepared solution of polymer an effective amount of at least one low molecular weight hydrocarbon selected from the group consisting of unsubstituted and halogenated $C_1$ alkanes and unsubstituted and halogenated $C_2$–$C_4$ alkanes, alkenes and alkynes, with the proviso that said hydrocarbon is a gas at ambient temperature and pressure (25° C. and 1 atmosphere);

(iii) subjecting said solution including said hydrocarbon to a temperature at which two liquid phases can form and a pressure sufficient to prevent the creation of a vapor phase;

(iv) adjusting said pressure such that a polymer-rich liquid phase and a polymer-lean liquid phase are formed;

(v) separating said polymer-rich liquid phase from said polymer-lean liquid phase; and (vi) recovering said polymer from said polymer-rich liquid phase.

The polymer solution is preferably the reaction product mixture from a solution reaction, such as a polymerization reaction, in which the polymer has been formed. The solution of polymer exits the reactor as an effluent stream to which the low molecular weight hydrocarbon can be added. If the effluent stream is deashed to remove catalyst residues, the low molecular weight hydrocarbon could be added to the effluent stream before or after deashing.

In a preferred embodiment, the process of the present invention is applied to continuously separate polymer from a reaction mixture in which it was formed. In such a continuous process, the solvent from the solution reaction mixture is recovered from the polymer-lean liquid phase and recycled back for use in forming a new solution reaction mixture. It is also preferred to recycle the vapor phase, if formed, and polymer-lean liquid phase so that they are brought into heat exchange contact with the reaction mixture and added hydrocarbon to supply part of the heat needed to increase the temperature of the reaction mixture and added hydrocarbon to the level required for phase separation.

In another preferred embodiment, the added hydrocarbon is recovered from the polymer-lean liquid phase and this recovered hydrocarbon is then recycled back for use in the step of adding low molecular weight hydrocarbon.

The polymer can be recovered from the polymer-rich liquid phase by steam stripping. Alternatively, the polymer can be recovered by desolventizing extrusion.

Low molecular weight hydrocarbons are added to the solution of the polymer in a solvent in amounts effective for the purpose. These amounts can be from about 2 to about 30 weight percent, and preferably from about 5 to about 20 weight percent, based on the weight of solution; provided, however, where the low molecular weight hydrocarbon is methane or a halogenated $C_1$ alkane, it is utilized at about 2 to about 10.8 wt.% and where the low molecular weight hydrocarbon is halogenated or unhalogenated ethane, acetylene or ethylene, it is utilized at about 2 to about 21 wt.%.

Suitable low molecular weight hydrocarbons useful for practicing processes in accordance with the present invention would be at least one low molecular weight hydrocarbon selected from the group consisting of unsubstituted and halogenated $C_1$ alkanes and unsubstituted and halogenated $C_2$–$C_4$ alkanes, alkenes, and alkynes, with the proviso that said hydrocarbon is a gas at ambient temperaure and pressure. Preferred low molecular weight hydrocarbons, particularly for the separation of ethylene-propylene or ethylene-propylene-nonconjugated diene copolymer elastomers, are selected from the group consisting of unsubstituted $C_1$ alkane and unsubstituted $C_2$–$C_4$ alkanes and alkenes.

Illustrative examples of low molecular weight hydrocarbons would be methane, iso-butane, ethylene, ethane, propane, propylene, butane, 1-butene, 2-butene, acetylene, propadiene, 1,4-butadiene, dichlorodifluoromethane, monochlorotrifluoromethane, trifluoromethane, methylchloride, monochloropentafluoroethane, hexafluoroethane, trifluoroethane, pentafluoroethane, monochlorotrifluoroethylene, tetrafluoroethylene, vinylidene fluoride and vinyl fluoride. For the production of ethylene-propylene or ethylene-propylene-non-conjugated diene copolymers, methane, ethane, propylene and ethylene are preferred.

The reaction conditions for preparing polymers in solution are well known as are the solvents, comonomers, catalysts and cocatalysts for such systems. Illustrative solvents which can be used in the reaction mixture for processes in accordance with the present invention include aliphatic or aromatic hydrocarbons and halogenated hydrocarbons such as pentane, hexane, 2-methyl hexane, cyclohexane, benzene, toluene, dichloroethane, dichlorobenzene, and tetrachloroethylene. Preferred solvents are $C_5$ to $C_7$ alkanes.

Many hydrocarbon polymers can be separated from the solutions containing them by processes in accordance with the present invention. For example, copolymers of ethylene with a higher alpha-olefin such as propylene, 1-butene, 1-pentene, 1-hexene and mixtures thereof can be recovered by the process of the present invention. A preferred ethylene copolymer elastomer is a copolymer of ethylene and propylene.

Also, terpolymers of ethylene with one of the above-mentioned higher alpha-olefins and a non-conjugated diene such as ethylidene norbornene, 1,4-hexadiene, cyclopentadiene, methylene norbornene, norbornadiene, tetrahydroindene, and 1,5 cyclooctadiene can also be recovered. A preferred terpolymer contains ethylene, propylene and 5-ethylidene norbornene.

Halobutyl rubbers can also be separated from their solutions. These polymers are well-known in the art and include halogenated rubber copolymers of isobutylene and isoprene which are normally produced using methyl chloride as diluent and a cationic catalyst such as aluminum trichloride. Preferably, the copolymers have an isobutylene content of from about 96 to 99.5 weight percent. The halogenated polymer desirably contains chlorine or bromine in a amount from about 0.5 to about 1.5 weight percent. It contains not more than one atom of chlorine or not more than three atoms of bromine per double bond present in the original copolymer, and preferably it contains from 0.5 to 2 weight percent of chlorine or from 0.5 to 5 weight percent bromine. Most preferably, the halogenated polymer is chlorinated butyl rubber containing from 1.5 to 2.5 weight percent chlorine. These halogenated butyl rubbers may be prepared by means known in the art. For instance, the butyl rubber may be dissolved in an inert hydrocarbon solvent such as pentane, hexane or cyclohexane and halogenated by addition to the solution of elemental chlorine or bromine. In a typical commercial process, butyl rubber is dissolved in a solvent to form a solution containing from about 5 to about 30 weight percent of rubber. Elemental chlorine or bromine is added to the solution, at a temperature of 0° to about 100° C., in sufficient quantity that the chlorinated or brominated rubber recovered contains up to 1 atom of chlorine or up to 3 atoms of bromine per carbon-carbon double bond originally in the butyl rubber.

The temperature and pressure conditions for obtaining phase separation in the process of the present invention vary depending upon many factors including the molecular weight of the polymer, the solvent used in the polymerization reaction and the hydrocarbon added to the reaction mixture. Thus, no one set of temperature and pressure conditions can be defined for the process for the present invention. However, generally, the temperature should be chosen such that good separation of the polymer from the solvent and added hydrocarbon is obtained, i.e., the polymer-lean liquid phase resulting after phase separation should contain less than 5 weight percent of the total polymer and preferably less than 1 weight percent. Generally, the temperature is in the range of from about 60° to about 300° C. and the pressure is in the range of from about 50 to about 1000 psig during the phase separation step.

Typically, the pressure of the reaction mixture and added hydrocarbon is increased to the desired level by a suitable pump. Such pressure is usually in the range of from about 200 to about 2000 psig and preferably in the range of from about 500 to about 1500 psig. The temperature of the reaction mixture hydrocarbon system is then increased by heat exchange with steam and/or recycled solvent and hydrocarbon from the phase separator. This temperature is normally in the range of from about 50° to about 300° C., preferably in the range of from about 70° to about 250° C. The pressure of the reaction mixture/hydrocarbon system is then reduced to a point sufficient to give phase separation into the two liquid phases. Alternatively, the pressure can be reduced to slightly below the bubble point of the reaction mixture-hydrocarbon system. This pressure is normally in the range of from about 50 to about 1000 psig but, of course, varies depending upon the solvent and hydrocarbons used.

Of course, various procedures in changing the temperature and adjusting the pressure of the reaction mixture/hydrocarbon system can be used to reach the conditions at which the phase separation occurs. For example, the pressure can be first raised to a high enough level such that one phase is always present as the temperature is increased in subsequent heat exchange steps. After the final temperature is attained the pressure is lowered to cause phase separation. Alternatively, the pressure can be set at a lower level initially so that a two phase mixture forms as the temperature is raised. Depending upon the nature of the phases formed, this procedure may increase the rate of heat transfer to the polymer mixture by reducing the viscosity. Once the final temperature is reached, the pressure is then adjusted to give the desired phase separation.

A preferred process employs $C_5$ to $C_7$ alkanes as the solvent for a reaction mixture containing either ethylenepropylene copolymers or halogenated butyl rubber. Methane, ethane, ethylene and propylene are the preferred hydrocarbons with ethylene-propylene copolymers and iso-butene with the halogenated butyl rubber. With such solvent and hydrocarbon components, it is preferred to first raise the pressure of the reaction mixture/hydrocarbon system to from about 10 to about 2000 psig. The temperature is then preferably increased from reaction temperature to between 70° to 200° C., depending upon the solvent and hydrocarbon added, after which the reaction mixture/hydrocarbon system is preferably passed through a valve into the phase separator lowering the pressure to a final value of about 150 to about 1500 psig. If the optional vapor phase is to be formed, the final pressure depends upon various factors and is approximately from about 0.5 to about 10 psig less than the bubble point of the reaction mixture/hydrocarbon.

DETAILED DESCRIPTION OF THE INVENTION

Figure 1:
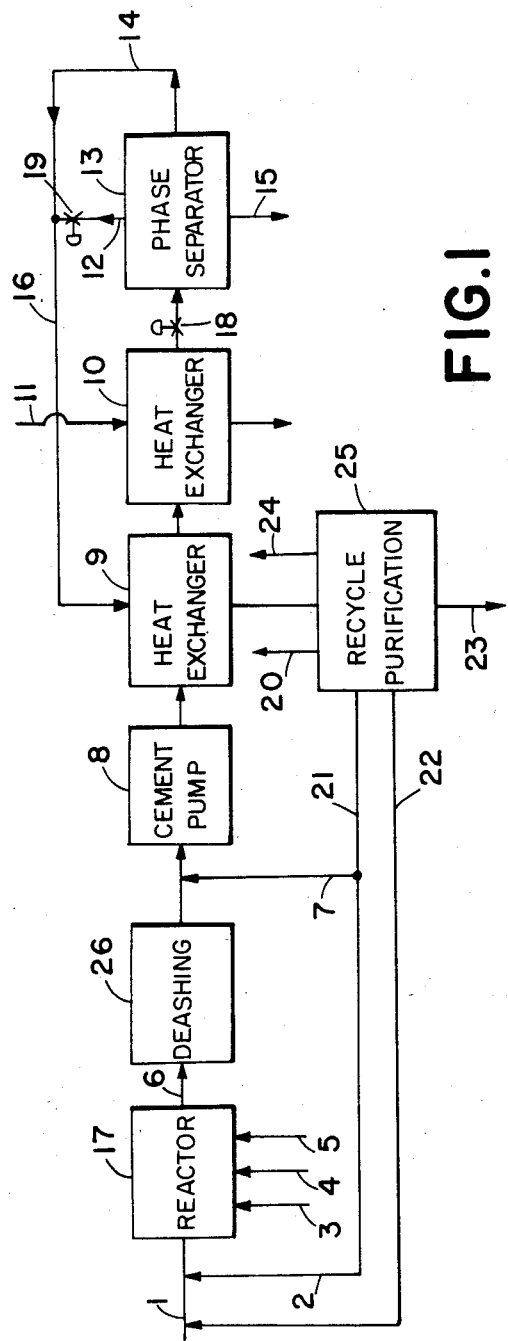
FIG. 1 is a schematic representation of a process in accordance with the present invention.

The process of the present invention is illustrated with reference to FIG. 1 in which a continuous flow stirred reactor 17 is fed with a solution of monomer(s) for the preparation of the desired polymer, such as ethylene, propylene and ethylidene norbornene, in a solvent such as normal hexane, through line 1. A suitable polymerization catalyst such as Ziegler catalyst and organoaluminum cocatalyst can be fed to the reactor 17 through separate lines 3 and 4. Hydrogen for control of the polymer molecular weight may be added via line 5.

The polymerization reaction forming the polymer takes place in the reactor 17. The composition and molecular weight of the polymer can be varied by changing the proproportions of the monomers, catalysts and cocatalysts in the reactor system and the temperature in the reactor.

The polymer solution leaves the reactor 17 through line 6 and the catalyst residues can be removed in a deasher 26 by techniques well known in the art. The low molecular weight hydrocarbon which in this case is propylene is added to the polymer solution through line 7 in order to reduce the solubility of the polymer. This mixture then enters cement pump 8 and the pressure is raised to a suitable pressure. By heat exchange in exchanger 9, the temperature of the polymer solution is raised, for example, from about 40° C. to about 100° C. The temperature is further increased by heat exchange with high pressure steam which enters exchanger 10 through line 11.

The heated, pressurized polymer solution and added hydrocarbon at this point are in one liquid phase. The solution and added hydrocarbon then pass through a valve 18 to a pressure sufficient to give phase separation and the mixture passes into separator 13. As a result of the drop in pressure, two liquid phases form in the separator 13. If it is desired to form the optional vapor phase , the pressure of the solution through valve 18 is lowered to a point slightly below the bubble point of the solution, and a vapor phase and two liquid phases form in the separator. One of the liquid phases is a polymer-rich liquid phase. This polymer-rich phase leaves the separator via line 15 and the polymer is recovered from it either by steam stripping to remove the remaining solvent followed by extrusion drying or by desolventizing extrusion.

It is preferably that the process be continuous. In order to do so, any vapor generated in the phase separator 13 is withdrawn through valve 19 via line 12. Valve 19 also serves to maintain a constant pressure in the separator 13 by means of a pressure control system. The polymer-lean phase is removed from the separator 13 through line 14 and combined in line 16 with the withdrawn vapor, if any. The vapor phase and polymer-lean phase contain a high heat content and are used in heat exchanger 9 to supply some of the heat needed to raise the temperature of the polymer solution coming from the cement pump 8. This stream of vapor and polymer-lean solution then goes to a recycle purification system 25, which consists of a series of distillation towers, where it is separated into solvent, which is recycled to the reactor 17 via line 22, propylene which is recycled via line 21 to lines 2 and 7 for use both in the polymerization reaction mixture and as the hydrocarbon for reducing the polymer solubility. The recycle purification system 25 also has three purge streams 20, 23 and 24 to dispose of components having boiling points less than the hydrocarbon (purged via line 20), between the hydrocarbon and the solvent for the polymerization reaction mixture (purged via line 24) and higher than the solvent (purged via line 23).

Figure 2:
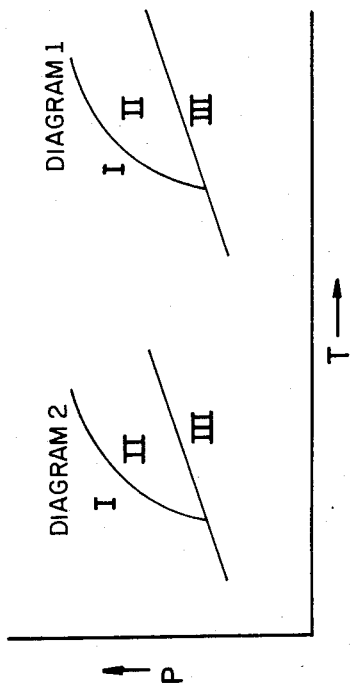
FIG. 2 is a phase diagram representing the polymer/solvent systems before and after addition of low molecular weight hydrocarbon.

The effect of adding the hydrocarbon in accordance with the present invention is illustrated in FIG. 2. Diagram 1 represents an exemplary solvent/polymer phase diagram in the absence of any added hydrocarbon. Diagram 2 represents the effect on the same solvent/polymer system by adding a hydrocarbon. In both diagrams, area I represents conditions at which the solution reaction mixture with or without the added hydrocarbon exits as one liquid phase; area II represents conditions at which the solution reaction mixture with or without the added hydrocarbon form two liquid phases, one being a polymer-rich liquid phase and the other being a polymer-lean liquid phase; and area III represents conditions at which the two liquid phases and a vapor phase are formed.

As illustrated by FIG. 2, the whole phase diagram for the polymer/solvent system is shifted to lower temperatures when a low molecular weight hydrocarbon is added. Thus, separation of the solvent/polymer system into two liquid phases or, optionally, into two liquid phases and a vapor phase, in accordance with the present invention occurs at a lower temperature, thus decreasing the amount of energy needed to heat the polymer/solvent system to the temperature necessary to obtain efficient phase separation and also decreasing the incidence of polymer degradation due to high temperatures. Also, by decreasing the pressure in the phase separator to a point slightly below the bubble point of the polymer/solvent system a more concentrated polymer-rich liquid phase may be obtained.

The following examples are provided to illustrate processes in accordance with the present invention.

EXAMPLE 1

A terpolymerization of ethylene, propylene and ethylidene norbornene (ENB) is carried out in a continuous flow stirred reactor operated at 15 minutes residence time. The reactor is fed with a solution of ethylene, propylene and ENB in normal hexane at the following rates:

|  | Flow Rate (lb./hr.) |
| --- | --- |
| Ethylene | 422.2 |
| Propylene | 1300 |
| ENB | 55.6 |
| Hexane | 14650 |

$VOCl_3$ Ziegler catalyst and ethyl aluminum sesquichloride (EASC) cocatalyst are fed into the reactor through separate lines at the rate of 1.25 lbs./hr. for $VOCl_3$ and 4.5 lbs./hr. for EASC. In addition, 0.25 lbs./hr. of hydrogen is fed into the system to control the molecular weight of the polymer.

The polymerization reaction mixture leaving the polymerization reactor contains 1000 lb./hr. of ethylene/propylene/ethylidene norbornene (EPDM) terpolymer, 42.2 lb./hr. ethylene, 730 lb./hr. propylene, 5.6 lb./hr. ethylidene norbornene, and 14650 lb./hr. hexane. The catalyst residues in the reactor mixture are removed by a deashing technique. Additional propylene (1320 lb./hr.) is then added to the polymer solution in order to decrease the polymer solubility. The pressure of the polymer reaction mixture/added propylene system is increased by a cement pump to 1000 psig. By heat exchange in a heat exchanger with hot solvent recycled from the phase separator, the temperature of the polymer solution is first raised from 40° C. to 150° C. The temperature is then further increased to 180° C. by heat exchange with 600 psig steam.

The heated, pressurized polymer reaction mixture/added propylene system then passes through a valve into a phase separator to lower the pressure to 412 psig which is approximately 2 psig less than the bubble point of the polymer reaction mixture/added propylene system. As a result of the drop in pressure, a vapor phase and two liquid phases form in the separator, i.e., a polymer-rich liquid phase and a polymer-lean liquid phase. The small amount of vapor generated in the separator is withdrawn through a valve which serves to maintain a constant pressure in the separator by means of a pressure control system. The upper polymer-lean liquid phase consists primarily of hexane and propylene and contains about 0.2 weight percent polymer, while the lower polymer-rich liquid phase consists of about 60 percent hexane and about 40 percent polymer.

The polymer-rich liquid phase is then separated from the vapor phase and polymer-lean liquid phase, and the polymer is recovered by desolventizing extrusion.

In comparison to the above discussed procedure, if no propylene is added to the polymer solution, a polymer-rich liquid phase does not form in the separator. In fact, it would require a temperature of about 210° C. in order to obtain an equivalent phase separation without the added propylene.

EXAMPLE 2

The procedure of Example 1 is repeated except that the temperature in the phase separator is raised to 205° C. to reduce the amount of polymer remaining in the polymer-lean phase formed in the separator. At this temperature, the separator pressure is decreased to 520 psig which is approximately 2 psig below the bubble point of the polymer reaction mixture/added propylene system. Under these conditions, the polymer-lean liquid phase contains only about 0.08 weight percent polymer.

In comparison with the process of Example 2, if no propylene were added to the polymer reaction mixture, the polymer-lean phase would contain about 0.22 weight percent polymer.

EXAMPLE 3

The procedure as described in Example 1 was again repeated except that the polymerization solent used was isopentane instead of hexane. Because isopentane is a poorer solvent than hexane for EPDM, phase separation can be obtained at a much lower temperature. Thus, at the flow rates used in this example, the pressure of the polymer solution is raised from 100 psig to 500 psig with a cement pump. The temperature is then increased to 80° C. by passage of the reaction/mixture added propylene stream through heat exchangers. By reducing the pressure by 118 psig with a valve opening into a separator, phase separation occurs as described in Example 1. This pressure is about 2 psig less than the bubble point of the reaction mixture/added propylene system. At these conditions, the polymer-lean liquid phase contains about 1.0 weight percent polymer.

In comparison to the results found by the process of this Example, if no propylene were added to the polymer reaction mixture, phase separation would not occur. In fact, it would require a temperature of about 120° C. to obtain an equivalent phase separation as obtained by the process of this example if no propylene were added.

EXAMPLE 4

The procedure of Example 3 was repeated, except that the pressure of the isopentane polymer solution was raised to 1000 psig with a cement pump and the temperature was increased to 140° C. by the heat exchangers in order to reduce the quantity of polymer remaining in the polymer-lean phase. At this temperature, the separator pressure was decreased to 335 psig which is approximately 2 psig below the bubble point of the reaction mixture/added propylene system. Under these conditions, the polymer-lean phase formed in the phase separator contains about 0.08 weight percent polymer.

By contrast, to the results obtained by the process of Example 4 above, the polymer-lean liquid phase would contain about 0.2 weight percent polymer if no propylene were added to the polymer reaction mixture.

EXAMPLE 5

The procedure of Example 1 is repeated except that 2022 lb./hr. of ethylene are added to the polymer solution in order to decrease the polymer solubility. The pressure of the polymer reaction mixture/added ethylene system is increased by a cement pump to 1000 psig. The temperature of the system is increased to 120° C. by means of the described heat exchanger system. The heated, pressurized polymer reaction mixture/added ethylene system then passes through a valve into a phase separator to lower the pressure to 800 psig.

As a result of the pressure drop, two liquid phases form in the separator, i.e., a polymer-rich liquid phase and a polymer-lean liquid phase. The polymer-rich liquid phase is then separated from the polymer-lean liquid phase, and the polymer is recovered by desolventizing extrusion.

EXAMPLE 6

The procedure of Example 1 is repeated except that 1582 lb./hr. of methane are added to the polymer solution in order to decrease the polymer solubility. The pressure of the polymer reaction mixture/added methane system is increased by a cement pump to 1800 psig. The temperature of the system is increased to 90° C. by means of the described heat exchanger system. The heated, pressurized polymer reaction mixture/added methane system then passes through a valve into a phase separator to lower the pressure to 1500 psig.

As a result of the pressure drop, two liquid phases form in the separator, i.e., a polymer-rich liquid phase and a polymer-lean liquid phase, and the polymer is recovered by desolventizing extrusion.

EXAMPLE 7

The procedure of Example 1 is repeated except that 1436 lb./hr. of methane and 1275 lb./hr. of propylene are added in combination to the polymer solution in order to decrease the polymer solubility. The pressure of the polymer reaction/mixture/added methane and propylene system is increased by a cement pump to 1700 psig. The temperature of the system is increased to 60° C. by means of the described heat exchanger system. The heated, pressurized polymer reaction mixture/added methane and propylene system then passes through a valve into a phase separator to lower the pressure to 1250 psig.

As a result of the pressure drop, two liquid phases form in the separator, i.e., a polymer-rich liquid phase and a polymer-lean liquid phase. The polymer-rich liquid phase is then separated from the polymer-lean liquid phase, and the polymer is recovered by desolventizing extrusion.

It will be understood that the embodiments described above are merely exemplary and that persons skilled in the art may make many variations and modifications without departing from the spirit and scope of the invention. All such modifications and variations are intended to be included within the scope of the invention as defined by the appended claims.

What is claimed is:

1. A process for the recovery of hydrocarbon polymer from a solution of said polymer comprising:
   (i) preparing the solution of polymer in a reactor;
   (ii) adding to the thus-prepared solution of polymer an effective amount of at least one low molecular weight hydrocarbon selected from the group consisting of unsubstituted and halogenated $C_1$ alkanes and halogenated $C_2$–$C_4$ alkanes, alkenes, alkynes with the proviso that said hydrocarbon is a gas at ambient temperature and pressure; provided, however, that where the low molecular weight hydrocarbon is a $C_1$ halogenated or unhalogenated alkane, it is utilized at about 2 to about 10.8 wt. % based on the polymer solution, and further provided that where the low molecular weight hydrocarbon is a $C_2$ halogenated or unhalogenated alkane, alkene, or alkyne, it is utilized at about 2 to about 21 wt. % based on the polymer solution; still further provided that where the low molecular weight hydrocarbon is a $C_3$–$C_4$ halogenated or unhalogenated hydrocarbon it is utilized at about 2 to about 30 wt. % based on the polymer solution;
   (iii) subjecting said solution including said hydrocarbon to a temperature at which two liquid phases can form and a pressure sufficient to prevent the creation of a vapor phase;
   (iv) adjusting said pressure such that a polymer-rich liquid phase and a polymer-lean liquid phase are formed;
   (v) separating said polymer-rich liquid phase from said polymer-lean liquid phase; and
   (vi) recovering said polymer from said polymer-rich liquid phase.

2. A process according to claim 1 wherein from about 2 to about 30 weight % of a $C_3$–$C_4$ hydrocarbon based on the polymer solution, is added to said polymer solution.

3. A process according to claim 2, wherein said polymer comprises ethylene-propylene copolymer elastomer.

4. A process according to claim 2, wherein said polymer comprises a terpolymer of ethylene, a higher alpha-olefin and a non-conjugated diene.

5. A process according to claim 4, wherein said polymer is a terpolymer of ethylene, propylene and 5-ethylidene norbornene.

6. A process according to claim 2, wherein said polymer comprises halobutyl rubber.

7. A process according to claim 6, wherein said halobutyl rubber comprises chlorobutyl rubber.

8. A process according to claim 1, wherein said solvent is a member selected from the group consisting of aliphatic, aromatic and halogenated hydrocarbons.

9. A process according to claim 1, wherein said solvent is a $C_5$ to $C_7$ aliphatic hydrocarbon.

10. A process according to claim 1, wherein said solution of polymer prepared in a reactor exits from said reactor as an effluent stream, and wherein said low molecular weight hydrocarbon is added to said effluent stream.

11. A process according to claim 1, wherein after preparation of said solution of polymer in said reactor, reaction mixture from said reactor is deashed to remove catalyst residues, and wherein said low molecular weight hydrocarbon is added to said reaction mixture after deashing.

12. A process according to claim 1, wherein said low molecular weight hydrocarbon is selected from the group consisting of unsubstituted $C_1$ alkane and unsubstituted $C_2$–$C_4$ alkanes and alkenes.

13. A process according to claim 1, wherein said low molecular weight hydrocarbon is unsubstituted $C_1$ alkane.

14. A process according to claim 1, wherein said low molecular weight hydrocarbon is at least one halogenated $C_1$ alkane.

15. A process according to claim 1, wherein said low molecular weight hydrocarbon is at least one halogenated $C_2$–$C_4$ alkane.

16. A process according to claim 1, wherein said low molecular weight hydrocarbon is at least one halogenated $C_2$–$C_4$ alkene.

17. A process according to claim 1, wherein said low molecular weight hydrocarbon is at least one halogenated $C_2$–$C_4$ alkyne.

18. A process according to claim 1, wherein in step (iv) a vapor phase rich in said hydrocarbon is also formed.

* * * * *